April 20, 1965     J. J. WEIER     3,179,145
CIRCULAR METAL TIRE COVERINGS

Filed July 16, 1964     2 Sheets-Sheet 1

INVENTOR.
Jacob J. Weier.

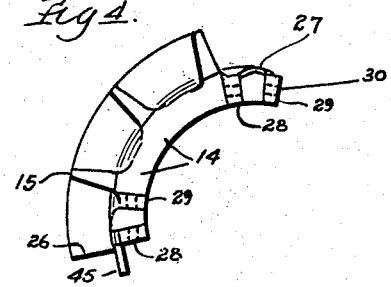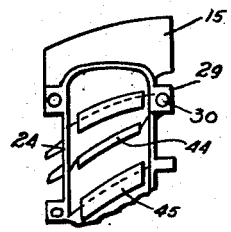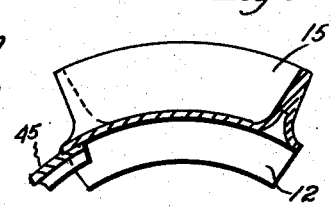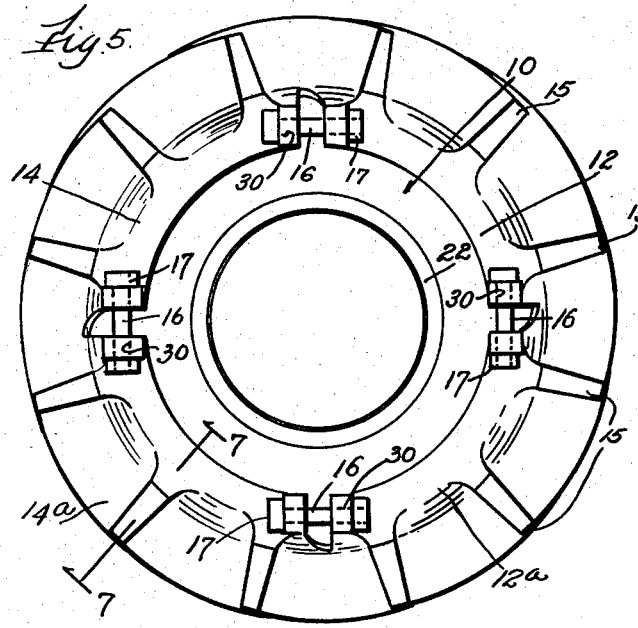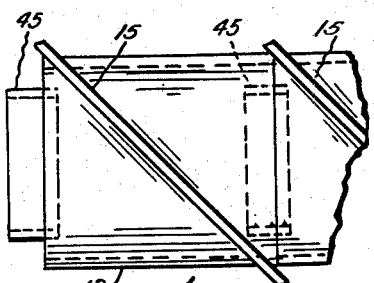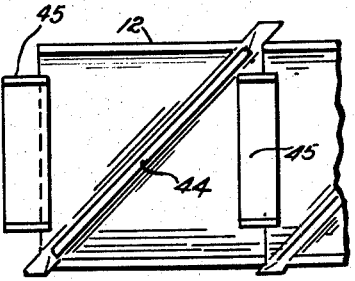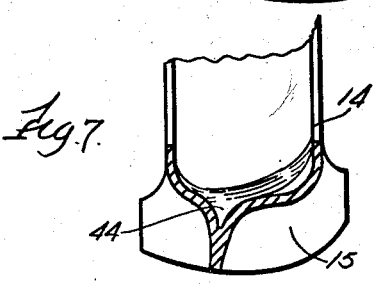

United States Patent Office 3,179,145
Patented Apr. 20, 1965

3,179,145
CIRCULAR METAL TIRE COVERINGS
Jacob J. Weier, 10611 S. Sawyer Ave., Chicago, Ill.
Filed July 16, 1964, Ser. No. 383,111
2 Claims. (Cl. 152—56)

This invention pertains to circular metal tire coverings and in particular to a new and useful improvement in circular metal tire coverings and is a continuation-in-part of application Serial No. 265,187, filed March 14, 1963, and now abandoned.

This invention relates to a traction device, and more particularly, an attachment for large pneumatic tires on the driving wheels of motor vehicles, such as logging tractors, swamp buggies and farm tractors, which shall be driven on soft or muddy ground.

The main object of this invention resides in the provision of a device of this character made of a metal which may be readily secured around a large pneumatic tire to provide increased traction means and to afford protection for the tires.

Another object of this invention is to provide a traction device for a large pneumatic tire which will remain on the tire even though the tire be subjected to a very strong side thrust, which tends to dislodge the tire from the wheel.

Another object of this invention is to increase the frictional engagement between large pneumatic tires on wheels and the soil, to provide a device which consists essentially of a plurality of circular complementary members having means for operatively associating with the tires in a removable manner, to provide a device with obliquely extending blades or cleats, spaced parallel with each other and integrally formed upon the exterior surface thereof, the cleats cutting grooves into the soil in the driving direction, whereby the wheels and tires thereon are secured against sliding in a lateral direction, thereby to a secured rolling movement of the tires and wheels without the losses of speed and of energy resulting from a slipping movement, to avoid excavations of the soil and to secure a safe propulsion and steerage of the motor vehicle under all circumstances.

An important object of this invention is to provide a device to protect large straight wall pneumatic tires on motor vehicles from damage by sharp ingredients or projections of the soil, to space these tires from the ground, and to provide the tires with a plurality of circular lamellas having large surfaces fitting the outer convex curvature of the tires and adjacent side wall portions thereof, whereby these circular lamellas form protective tire shields.

In the following description, the term traction blades cleats, shall now be called "cleats" and the term protective shields or cirular lamellas, shall now be called "channel sections."

These channel sections are integrally formed so that each of the said channel sections shall contain a plurality of cleats, also a plurality of hollow-cross-section grooves, which are the interior shape of the said cleats, and each of said channel sections shall contain a plurality of cross-rib extension-lip means.

The said cross-rib extension-lip means are integrally formed on the interior concave surfaces of the said channel sections and to project out beyond one end of each of said channel sections in circumferential driving direction, said cross-rib extension-lip means provide a resting also a bearing surface, for a sliding movement circumferentially and laterally, when one channel section rests on the other, in erection and application of the said channel sections to the outer convex surface of the said pneumatic tire.

The said hollow-cross-section grooves formed on the interior concave surface of the said channel sections are the internal shape of the said cleats, said hollow-cross-section grooves provided the said channel sections with rigid stability and impact strength and a reduction of weight in construction.

The said cleats are characterized of being trapezoidal in configuration and vertical in cross-section, diagonally arranged on the outer convex surface of the said channel sections.

A further object of this invention is to provide a traction device that provides the greatest possible strength per circular unit and per unit of the cross section.

These and further objects of my invention will be set forth in the following specification, reference being had to the acompanying drawings, and the novel means to which said objects are effectuated will be definitely pointed out in the claims.

In the drawings:

FIGURE 4 is a side elevational view of the improved traction device shown in FIGURE 5, showing one circular channel section thereof;

FIGURE 5 is a side elevational view of the improved traction device shown in FIGURE 1 with the combination under load;

FIGURE 6 is an inside elevational view of the inside of the concave surface of one circular channel section, showing the oblique hollow-cross-section grooves and cross-rib extension-lip means;

Figure 1:
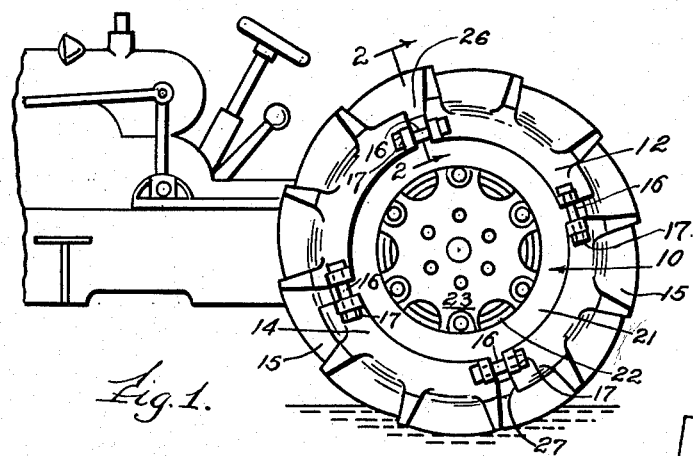
FIGURE 1 is a side elevational view showing a vehicle wheel and pneumatic tire, with improved traction device in position on the tire, mounted on rims that are fitted to the wheel, fastened with common lugs now in use.

FIGURE 7 is a fragmentary sectional view taken substantially in line 7—7 of FIGURE 5, showing a portion of the hollow-cross-section groove 44 that forms the interior configuration of the said cleat 15, of which the said cleats 15 are trapezoidal and vertical in cross-section, integrally formed with the outer convex surface of the said channel sections, 12, 12A, 14, and 14A;

FIGURE 8 shows a detail section of one channel section unit;

FIGURE 9 is a top exterior view of the channel section unit, showing cross-rib extension-lip 45, and cleat 15;

FIGURE 10 is an interior view of the channel section unit, showing the cross-rib extension-lip 45, and hollow-cross-section groove 44.

Each channel section can be referred to as a circular metallic casing of an ellipsoidal-shaped configuration in cross section, clearly shown in FIGURES 2, 6, 7 and 8.

The flat sides of the ellipsoidal-shaped channel sections are in juxtaposition with the flat side walls of the rubber tire and enclose the outer convex portion of the said rubber tire, the manner of accomplishing the foregoing object, as well as further objects and advantages, will be made manifest in the following description.

The rubber tire 10 illustrated herein is of the character that is commonly used on vehicles, with rubber cleats thereon.

The traction device of this invention comprises of essentially four circular, substantially identical, channel sections 12, 12A, 14 and 14A, embodying rigid cleats 15, integrally formed thereon.

Each of these channel sections 12, 12A, 14 and 14A, are clearly shown in FIGURES 1 and 5.

One channel section is clearly shown in FIGURES 4 and 6.

The channel sections 12, 12A, 14 and 14A which are transversely, ellipsoidal-shaped to conform to the convex shape of the rubber tire 10 and rubber cleats 13 thereon, and when joined together by bolts 16 and nuts 17 they form an annulus which entirely surrounds the tread and approximately one-third of the side wall area of the rubber tire 10, the upper area 20 of rubber tire 10 is enclosed while the lower area 21 adjacent the rim 22 of the wheel 23 is uncovered.

Each of the channel sections 12, 12A, 14 and 14A, are provided upon opposite sides 24 and 25 adjacent their ends 26 and 27 with laterally extending lugs 28 and 29, integrally formed thereto, provided with a central bore 30 extending therethrough, through which bolts 16 pass.

When the channel sections are assembled on a tire, the bolts 16 are inserted through the bores 30 in each pair of lugs 28 and each pair of lugs 29 and nuts 17 are screw-threaded upon the threaded ends of the bolts 16, whereby the channel sections are assembled and held in position upon the tire 10.

Figure 2:
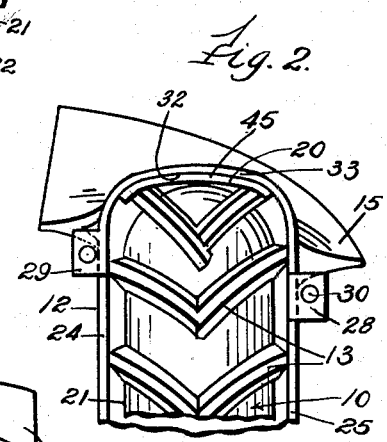
FIGURE 2 is a fragmentary transverse sectional view taken along the line 2—2 of FIGURE 1 showing cross-rib extension-lip means.

By FIGURE 2 the lower side walls 21 of the tires 10, extend vertically within the vertical side walls 24 and 25 of the channel sections, the rubber cleats 13 integrally formed with the exterior road gripping portion of the tire 10, fit within and in intimate contact with cross-rib extension-lip means and the interior surface 32 of the concave portion 33, forming the closed portion of said channel section members 12, 12A, 14 and 14A.

In FIGURES 4, 6, 8, 9, and 10, cross-rib extension-lip means 45 are shown, each channel section is so constructed to have one cross-rib extension-lip means projecting outwardly on one end of said channel sections in circumferential driving direction, the said cross-rib extension-lip means extend outwardly approximately one-and-one-half inches beyond one end of the said channel sections, affording a bearing and resting surface for a sliding movement when one channel section rests upon another, during erection and working operations.

Should the rubber cleats 13 become badly worn, or some extra space occur between the channel sections 12, 12A, 14 and 14A and the rubber tire 10, the inner concave surface of the channel sections are lined with felt or other cushioning material so as to supplement the spaces due to wear of the tire 10 in use.

With the increasing use of greater power for driving such vehicles, it becomes necessary to increase the traction effect of such tires in order to handle the load involved, in order to gain an increased measure of traction effect, the present invention applies a metallic traction device embodying a plurality of circular channel sections bolted together and each curved longitudinally and transversely and each provided on its outer convex surface with a plurality of parallel, spaced oblique traction members integrally formed thereto, the most practical type of traction device for the above use from the stand-point of efficiency in propelling the vehicle forward is a unit in which each channel section is circular in length and circumferential in driving direction.

One of the novel features of the invention resides in the provision of parallel, spaced, oblique metal cleats integrally formed to the convex surfaces of the said channel sections 12, 12A, 14 and 14A, a plurality of the cleats 15 are extended diagonally across the convex surface of each channel section and have their end portions extending a short distance beyond each of said channel sections, thereby contacting the ground adjacent the normal path.

As shown by FIGURES 1, 3, 4 and 5 of the drawings, each channel section comprises a plurality of diagonal, parallel spaced metal cleats, the cleats are characterized by being of concave-convex-curvature longitudinally, the radius of said longitudinal curvature being constant.

Figure 3:
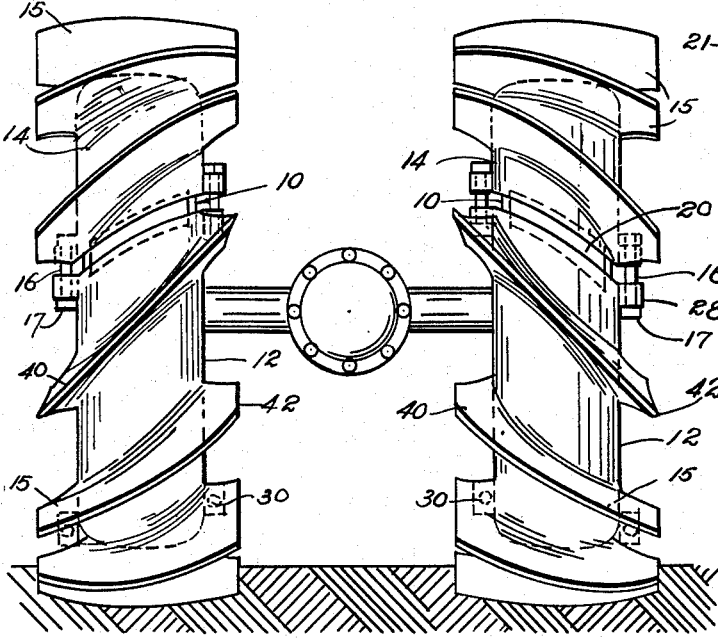
FIGURE 3 is a vertical rear elevational view of the improved traction devices shown in FIGURE 1 with the entire combination under load and showing the cleats thereof imbedded in the soil.

In FIGURE 3 the cleats 15 are trapezoidal in configuration, cleats 15 and the channel sections 12 and 14 are integrally formed of hard metal, such as aluminum, iron and steel.

The cleats 15 are each a continuous, unbroken blade extending beyond each of the said channel sections at approximately forty-five (45) degrees relative to the longitudinal axis of the said channel sections.

The far end 40 of each cleat 15 terminating at one side of the said channel section is in transverse alignment with the near end 42 of the following cleat 15, whereby a smooth substantially continuous road contacting surface is provided as the weight of the load is transferred to each adjacent cleat 15 as the wheel turns, whereby the cleats 15 actually cut into the ground, not pressed into the soil at one instant, the soil actually passes transversely between the cleats 15, thereby eliminating hill-climb.

The metal area upon the convex surface between the cleats 15 of each imperforated channel section is a closed smooth polished surface, no mud clings thereto, it is clearly seen that the cleats 15 are trapezoidal in configuration, diagonally arranged, transversely curved with their portion integrally formed with the convex surface of the said channel sections, the interior surface of each channel section being concave to substantially coincide with the convex surface of the rubber tires.

FIGURE 3 shows that the cleats 15 extend into the soil angle-wise, they thereby prevent side-slipping of the wheels on a hillside and further serve to prevent the locking of roots or stones between the cleats, the cleats 15 extend out beyond each side of the channel sections approximately two inches and are formed in reverse, those for the left side wheel extending forwardly and inwardly, as well as those on the right side thereof, where they extend inwardly and forwardly, providing a maximum anti-slipping surface of the soil allowing the wheels to travel in a straight path.

One of the novel features of this invention are that the channel sections are preformed into a single channel section unit, each of the channel section units contain each of the following components, such as, a portion of the channel section, and one cleat that is integrally formed on the exterior convex surface of the channel section unit.

On the interior concave surface of the channel section unit there is one hollow-cross-section groove indentation and one cross-rib extension-lip which is formed to project beyond one end of the channel section unit, which will provide a resting and guiding surface, for the following channel section units to rest upon during erection and application operations.

A plurality of channel section units, are then butt-welded end-to-end to form a channel section of the desired length, a plurality of which when properly placed will form an annulus to completely surround the entire exterior surface and a portion of the side wall of the pneumatic tire.

In the past, the only traction devices that were offered to the tractor wheel trade was spade-lugs, skid-chains or the like, these attachments created hill-climb, that is the tractor wheel had to climb over them, disturbing the earth and causing a great power loss, whereas with the present invention the channel section the cleats 15 are integrally and diagonally formed at a forty-five (45) degree angle across the exterior convex surface of the channel sections, the cleats 15 cut into the soil as the wheel turns and moves forward, cutting into the firmer soil below the flotation area of the channel sections, and providing the most traction possible, eliminating all hill-climb, one of the most known power consuming obstacles in wheel traction operations.

In erection the operator places a suitable block of wood and one of the channel sections in front of the right and left driving wheels of the tractor, the tractor is then driven on and into both channel sections at one time, then the remaining channel sections are applied completing the circle.

While I have described one form of my invention I do not wish to be limited to the particular form shown and described as it is apparent to those skilled in the art that many modifications therein may be made without departing from the scope of the invention.

What I claim is:

1. A device for improving the traction of a motor vehicle driving wheel having a rubber tire thereon, said rubber tire having a circumferential tread, said traction device comprising a plurality of substantially identical, detachable, circular metal channel sections, transversely ellipsoidal-shaped, said channel sections having a ribbed concave surface formed by inwardly and circumferentially extending portions, and each section having correspondingly shaped lugs secured to the side wall portions thereof and adjacent the ends thereof, each of said lugs provided with suitable attaching means, said channel sections being adapted to be drawn firmly in contact with tread of said rubber tire by said attaching means, each of said channel sections having a plurality of substantially straight, parallel, diagonally spaced exterior metal cleats of trapezoidal vertical cross-section integrally formed to its concavo-convex curvature circumferentially, the longitudinal length of each of said cleats being greater than the transverse width of said ellipsoidal-shaped channel sections, said cleats extending outwardly beyond each side wall of said circular transversely ellipsoidal-shaped channel sections, said channel sections having a plurality of cross-rib extension-lip means integrally formed obliquely across the interior concave surface of said channel sections, said cross-rib extension-lip means provide a resting and bearing surface for a sliding movement circumferentially and laterally between said channel sections.

2. A device for improving the traction of a motor vehicle driving wheel having a pneumatic tire thereon, said pneumatic tire having a circumferential tread, said traction device comprising a plurality of metal channel sections, each channel section being imperforated and circular in circumferential configuration and ellipsoidal-shaped in transverse cross-section, each said channel section has a ribbed interior concave surface and correspondingly shaped lugs secured to the side wall portions thereof and adjacent the ends thereof, each of said lugs provided with a central bore for receiving bolt means arranged within said central bores of each adjacent pair of lugs, said channel sections being adapted to be drawn firmly in contact with the tread of said pneumatic tire, said channel section having a plurality of substantially straight, diagonally arranged, parallel metal cleats, said cleats being of trapezoidal vertical cross-section, integrally formed to its concavo-convex curvature circumferentially, the inner concave surfaces of said channel sections have a plurality of hollow-cross-section grooves, the said hollow-cross section grooves are the internal shape of the vertical trapezoidal cleats in cross-section integrally formed on the convex curvature surface of said channel sections, said hollow-cross-section grooves provide the said channel sections with rigid stability, impact strength and a reduction of weight in construction, said cleats being formed integrally with and to the smooth polished exterior convex surface of the closed bottom wall portion of said channel sections, whereby the smooth polished exterior convex surface between said cleats prevents mud and dirt from accumulating therebetween.

References Cited by the Examiner

UNITED STATES PATENTS

| | | | |
|---|---|---|---|
| 2,343,251 | 3/44 | Beard | 152—56 |
| 2,353,916 | 7/44 | Mickelson | 152—56 |
| 2,966,932 | 1/61 | Weier | 152—182 |

FOREIGN PATENTS 477,552  10/51  Canada.

ARTHUR L. LA POINT, *Primary Examiner.*